1,457,563

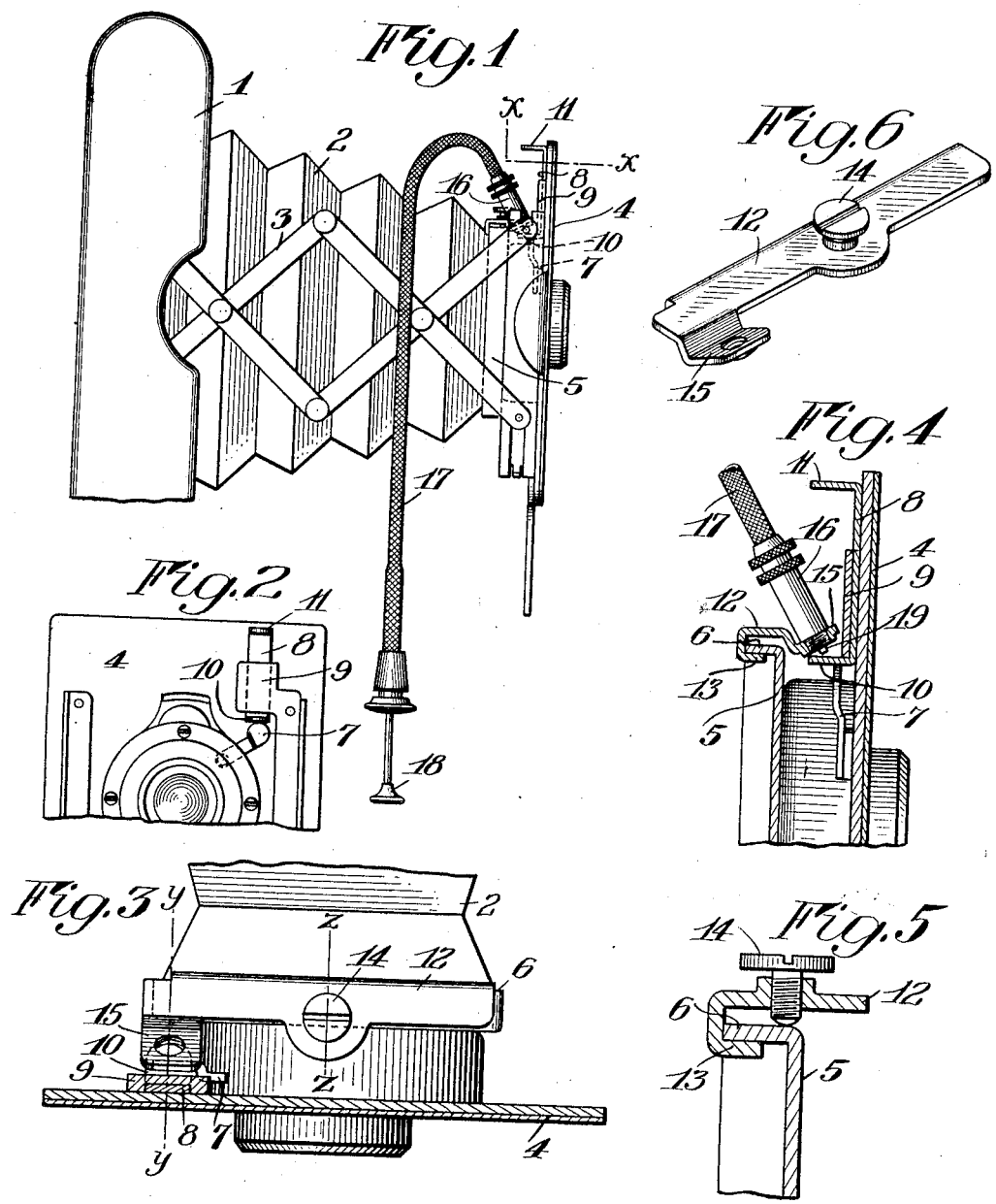

Patented June 5, 1923.

UNITED STATES PATENT OFFICE.

ERNEST E. UNDERWOOD, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-SHUTTER-OPERATING DEVICE.

Application filed October 28, 1918. Serial No. 259,913.

*To all whom it may concern:*

Be it known that I, ERNEST E. UNDERWOOD, of Rochester, in the county of Monroe and State of New York, have invented certain new and useful Improvements in Photographic-Shutter-Operating Devices; and I do hereby declare the following to be a full, clear, and exact description of the same, reference being had to the accompanying drawings, forming a part of this specification, and to the reference numerals marked thereon.

My present invention relates to operating devices for photographic shutters particularly applicable to cameras of the type shown in Letters Patent to John A. Robertson and Robert Kroedel, No. 1,107,358, August 18, 1914, and it has for its object to provide means for the ready attachment of a cable release for the shutter operating mechanism which can be quickly and conveniently applied and removed when desired. To these and other ends the invention resides in certain improvements and combinations of parts all as will be hereinafter more fully described, the novel features being pointed out in the claims at the end of the specification.

In the drawings:

Figure 1 is a side elevation of a photographic camera showing my invention applied thereto;

Figure 2 a rear elevation of the front plate carrying the lens;

Figure 3 a sectional view on the line x—x of Figure 1;

Figure 4 a vertical section on the line y—y of Figure 3, with a portion of the cable release in place;

Figure 5 a sectional view on the line z—z of Figure 3;

Figure 6 a perspective view of the attaching bracket removed.

Similar reference numerals throughout the several views indicate the same parts.

The camera to which my invention is shown applied is of the folding type embodying the rear body portion 1 connected by a bellows 2 and lazy tongs 3 with a front plate 4 carrying the lens and shutter and forming the covering for the operating parts when the camera is folded. The front end of the bellows is directly attached to a frame 5, as shown in said previously mentioned patent, or otherwise, and said plate is provided at its upper portion with a rearwardly extending flange 6 to which latter the attachment forming part of my invention is applied. The shutter may be of any desired type having a trip arm 7 with which cooperates a vertically movable slide 8 held against the plate 4 by a clip 9. The lower end of said slide has a lug 10 engaging the trip arm 7 and at the upper end thereof a lug 11 is provided on the slide for the manual operation of the shutter. The bracket shown in perspective in Figure 6, is preferably constructed of a single stamping comprising a body portion 12 having on its rear side a flange 13 adapted to extend beneath a rearwardly extending flange at the upper portion of the frame 5. A screw 14 passing through the body of the bracket engages the upper side of said flange, as shown in Figure 5, clamping the bracket securely in position. At one end of the body 12 is provided a lug 15 arranged at a slight angle, as shown, and provided with a threaded aperture into which is adapted to screw a thimble 16 forming part of a flexible shutter releasing device and in the present instance, connected to flexible cable covering 17 through which passes the flexible release wire, the outer end of the latter being provided with an operating knob 18 while the inner end 19 is in position to engage the lug 10 on the shutter operating slide 8, as shown particularly in Figure 4. It will thus be seen that the bracket may be readily applied to or removed from cameras of this type now in use, by the manipulation of the screw 14, and the location is such that not only may the cable release be readily applied to actuate the shutter but being behind and within the area of the cover plate 4, it may be left in position when the camera is folded, the flexible cable being disposed above or around the front end of the bellows and between the body and cover plate.

I claim as my invention:

1. A shutter releasing device for use with a folding camera of the type comprising a body, a movable front cover, a bellows connected to the body and to the cover within the area of the latter, and a photographic shutter on the cover having an actuating member in rear of the latter, said shutter releasing device embodying a flexible member adapted to be connected at one end to the inner side of the cover within the area thereof and to cooperate with said shutter actuating member, said flexible member being also adapted to be contained between the camera front and cover when the camera is folded.

2. A shutter releasing device for use with a folding camera of the type comprising a movable front having a flange at the rear thereof, a shutter having an actuating member and a slide on the front having lugs at each end, one engaging the shutter actuating member, said shutter releasing device comprising a body provided with a flange adapted to engage the flange on the camera front, a detachable securing device and a perforated lug adapted for the attachment of a shutter release arranged to be positioned adjacent one of the lugs on the slide.

3. An attachment for cameras comprising a body having a flange extending parallel therewith, an opposing securing screw and an aperture for the reception of a shutter cable release.

4. An attachment for cameras comprising a body having a flange at one side, an opposing securing screw and a lug arranged at an angle to the body and having an aperture for the reception of a shutter cable release.

ERNEST E. UNDERWOOD.